(12) United States Patent
Kobayashi

(10) Patent No.: US 6,606,459 B2
(45) Date of Patent: Aug. 12, 2003

(54) POP-UP STROBE MOUNTING STRUCTURE

(75) Inventor: Kazuharu Kobayashi, Kanagawa-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/949,827

(22) Filed: Sep. 12, 2001

(65) Prior Publication Data

US 2002/0034383 A1 Mar. 21, 2002

(30) Foreign Application Priority Data

Sep. 18, 2000 (JP) ........................................ 2000-281388

(51) Int. Cl.[7] ................................................ G03B 15/03
(52) U.S. Cl. ....................................................... 396/177
(58) Field of Search ................................ 396/176, 177, 396/178

(56) References Cited

U.S. PATENT DOCUMENTS

| 5,134,433 A | 7/1992 | Takami et al. |
| 5,142,465 A | 8/1992 | Sato |
| 5,233,378 A | 8/1993 | Hosokawa et al. |
| 5,245,374 A | 9/1993 | Hosokawa et al. |
| 5,721,984 A | 2/1998 | Kaneko et al. |
| 5,852,752 A | 12/1998 | Nakanishi et al. |
| 6,259,863 B1 * | 7/2001 | Maruyama ............... 348/64 |

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

A strobe mounting structure is used for retractably mounting a pop-up strobe on an upper portion of a single lens reflex camera having a pentagonal prism. The pop-up strobe has a strobe case which is movable between an operable position and a retracted position. The strobe case further has a pair of legs, which astride the pentagonal prism. Each of the pair of legs has a U-shaped cross section taken along a plane perpendicular to a longitudinal direction thereof. The strobe case is rotatably mounted on the upper portion of the single lens reflex camera by a shaft penetrating through opposing walls of each of the pair of legs.

7 Claims, 8 Drawing Sheets

POP-UP STROBE MOUNTING STRUCTURE

BACKGROUND OF THE INVENTION

The present invention relates to a mounting structure for retractably mounting a pop-up strobe on an upper portion of a camera body.

Conventionally, single lens reflex cameras having a retractable pop-up strobe on the upper portion of a camera body, e.g. above a pentagonal prism, have been well-known. Such a pop-up strobe generally has a strobe case accommodating a light emitting unit. The strobe case typically has a pair of legs, which are spaced apart from each other by a predetermined distance such that the strobe case straddles the pentagonal prism and is mounted on a camera body via the legs. Specifically, the end portions of the legs are pivotably secured to a decorative cover of the camera body using shafts disposed perpendicularly to the optical axis of a photographing lens system. With this structure, the strobe case is rotatable about the shafts, and the light emission unit is located between a retracted position where the light emitting surface is retracted within the camera body and an operable position where the light emitting surface is popped-up from the camera body. The shafts used for mounting the strobe case are inserted in mounting holes formed at the end portions of the legs from outside of the strobe case.

In the conventional pop-up strobe, the legs are relatively thin, and the shafts are inserted through holes formed on such thin end portions. Due to the structure, the mounting structure does not provide high stiffness or rigidity.

Further, since the shafts are inserted from outside of the strobe case, in view of appearance, a strobe cover should be attached so that the shafts are not exposed to the outside. The strobe cover also functions to protect portions of the light emitting unit other than the light emitting surface thereof. It should be noted that, due to the structure described above, if the strobe cover is attached to the strobe case before the shafts are inserted, it becomes difficult to mount the legs on the camera body using the shafts. Therefore, the strobe cover is usually attached after the strobe case is mounted on the camera body.

SUMMARY OF THE INVENTION

It is therefore an object of the present invention to provide an improved mounting structure of a pop-up strobe on a camera body, according to which assembling process of mounting the strobe on the camera body can be simplified. A further object of the invention is to provide a mounting structure of a pop-up strobe, with which relatively high stiffness and rigidity can be achieved.

For the object, according to the invention, there is provided a strobe mounting structure for retractably mounting a pop-up strobe on an upper portion of a single lens reflex camera having a pentagonal prism. The pop-up strobe has a strobe case which is movable between an operable position and a retracted position. The strobe case further has a pair of legs, which astride the pentagonal prism. Each of the pair of legs has a U-shaped cross section taken along a plane perpendicular to a longitudinal direction thereof. The strobe case is rotatably mounted on the upper portion of the single lens reflex camera by a shaft penetrating through opposing walls of each of the pair of legs.

With this structure, since each leg has a U-shaped cross section, and the shaft is inserted through both walls of each of the legs, relatively high stiffness and rigidity can be obtained.

Optionally, the opening of each of the pair of legs is directed outside a camera body when the strobe case is located in the retracted position. A strobe cover covering substantially an outlined shape of the strobe case and pair of legs is attached to the strobe case. Portions of the strobe case cover the pair of legs and the pair of legs form box-like structures, respectively.

According to this structure, the assembling process can be simplified.

Since each leg has a box-like structure, further strength can be obtained.

Further optionally, the upper portion of the camera may be provided with a decorative plate, and the strobe case may be mounted on the camera body via the decorative plate.

In this case, an end of at least one of the shafts penetrating the opposing walls of one of the pair of legs may be fitted in a shaft receiving recess formed on the decorative plate, and a fixing member may be secured onto the decorative plate such that the shaft receiving recess and the fixing member rotatably support the end of the at least one of the shafts.

Optionally, the fixing member may be provided with a hook member used for holding the strobe case at the retracted position.

In the above structure, at least one of the pair of legs may be formed with a groove extending in the longitudinal direction of the pair of legs and having a predetermined length. The strobe mounting structure may further include at least one link arm having first and second pins at end portions thereof. The first pin may be slidably inserted in the groove, and the second pin is rotatably supported on the decorative plate.

Optionally, a pin receiving recess may be formed on the decorative plate, and the second pin may be rotatably fitted in the pin receiving recess. Further, the fixing member may prevent the second pin from being dropped out of the pin receiving recess. Furthermore, the second pin may be rotatably supported by the pin receiving recess and the fixing member. The fixing member prevents the end of the at least one of the shafts from being dropped out of the shaft receiving recess, and the shaft receiving recess and the fixing member rotatably support the at least one of the shafts.

BRIEF DESCRIPTION OF THE ACCOMPANYING DRAWINGS

DETAILED DESCRIPTION OF THE EMBODIMENTS

Hereinafter, a pop-up strobe for a camera according to an embodiment of the invention will be described with reference to the accompanying drawings.

Figure 1:
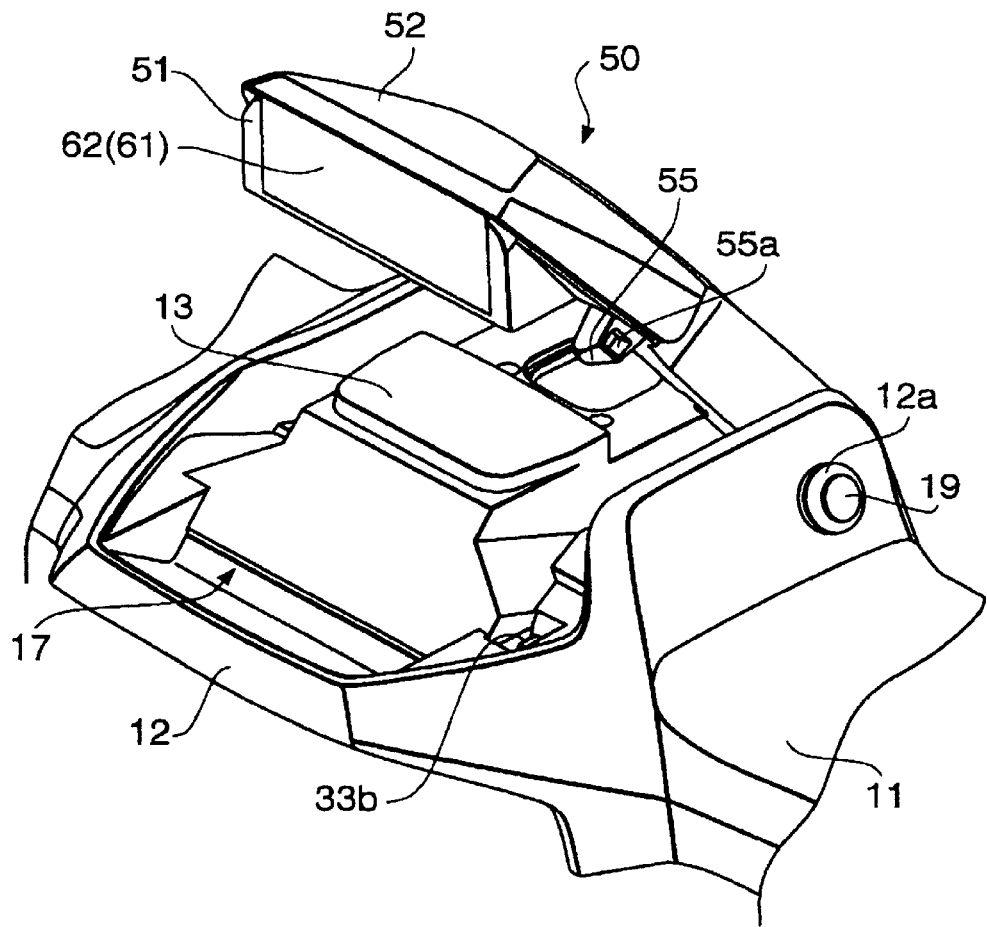
FIG. 1 is a perspective view of a pop-up strobe mounted on a top portion of a camera, when located at a popped-up (operable) position.
Figure 2:
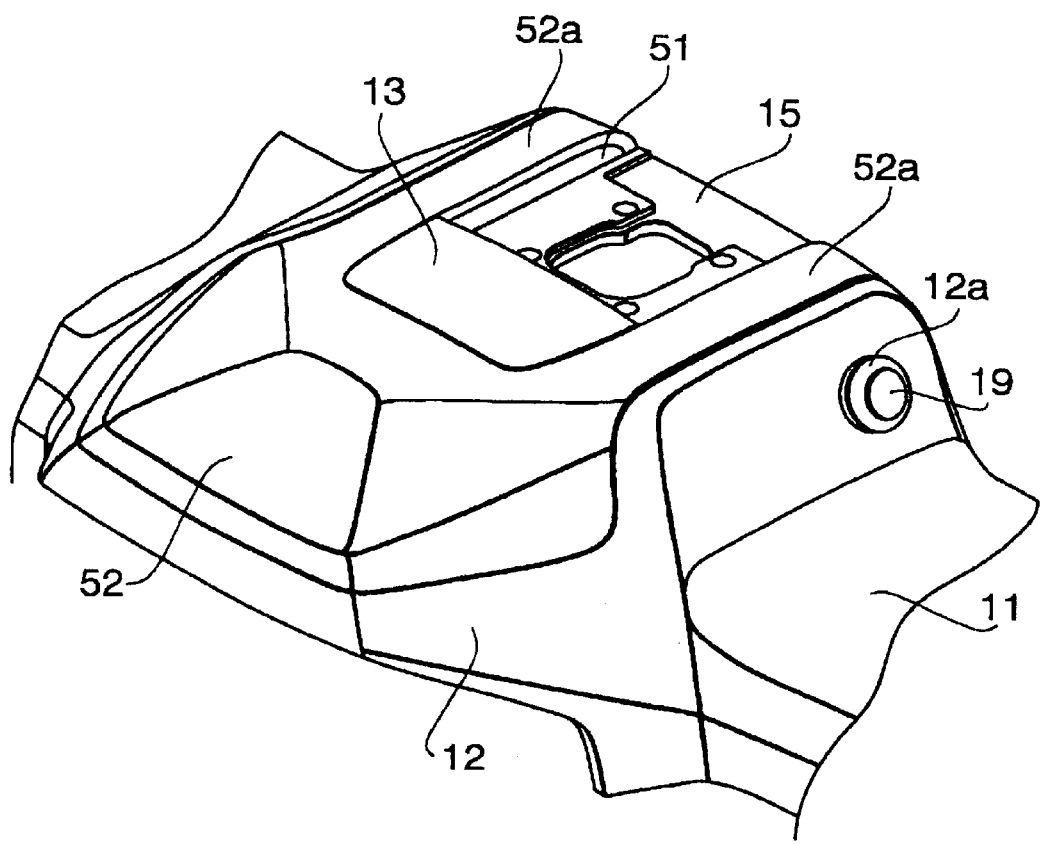
FIG. 2 is a perspective view of the pop-up strobe of located at a retracted position.

FIGS. 1 and 2 show perspective views of a pop-up strobe mounted on a top portion of a single lens reflex (SLR) camera employing a mounting structure according to an embodiment of the invention. FIG. 1 shows the pop-up strobe as popped-up and located at an operable position, and FIG. 2 shows the pop-up strobe as retracted.

At an upper portion of the SLR (single lens reflex) camera, a decorative cover 11 is provided. The decorative cover 11 includes a bulging portion 12, which covers the upper portion of a pentagonal prism. The bulging portion 12 is formed with a recessed portion, on which a roof 13 for covering the pentagonal prism, an accessory shoe 15, and a strobe accommodating portion 17 are formed. The pop-up strobe accommodating portion 17 is defined as a space above the pentagonal prism, where an external unit 50 of the pop-up strobe is accommodated when the pop-up strobe is retracted.

The external unit 50 includes a strobe case 51 and the strobe cover 52 attached to the strobe case 51. When the external unit 50 is retracted in the accommodating portion 17, the strobe cover 52 and the decorative cover 11 form the appearance of the upper portion of the camera body.

The strobe case 51 is provided with two legs 53 and 54, which are extending from the strobe case 51 such that the strobe case 51 astride the roof portion 13. On a space defined at the tip side of the strobe case 51, a light emitting unit 61 is secured. The light emitting unit 61 includes a Xenon tube, reflector and the like. A light emitting surface 62 is defined on the light emitting unit 61. When the external unit 50 is located at the operable position (i.e., when it is popped up) as shown in FIG. 1, the light emitting surface 62 is directed toward an object. Optionally, a Fresnel lens is provided on the light emitting surface 62 for converging light emitted by the Xenon tube.

The end portions of the legs 53 and 54 are rotatably supported on the bulging portion 12 so that the strobe case 51 can be located between a popped-up position (i.e., operable position) at which the light emitting unit 61 is directed toward an object (FIG. 1) and a retracted position at which the light emitting unit 61 is retracted into accommodation portion 17 (FIG. 2).

Figure 4:
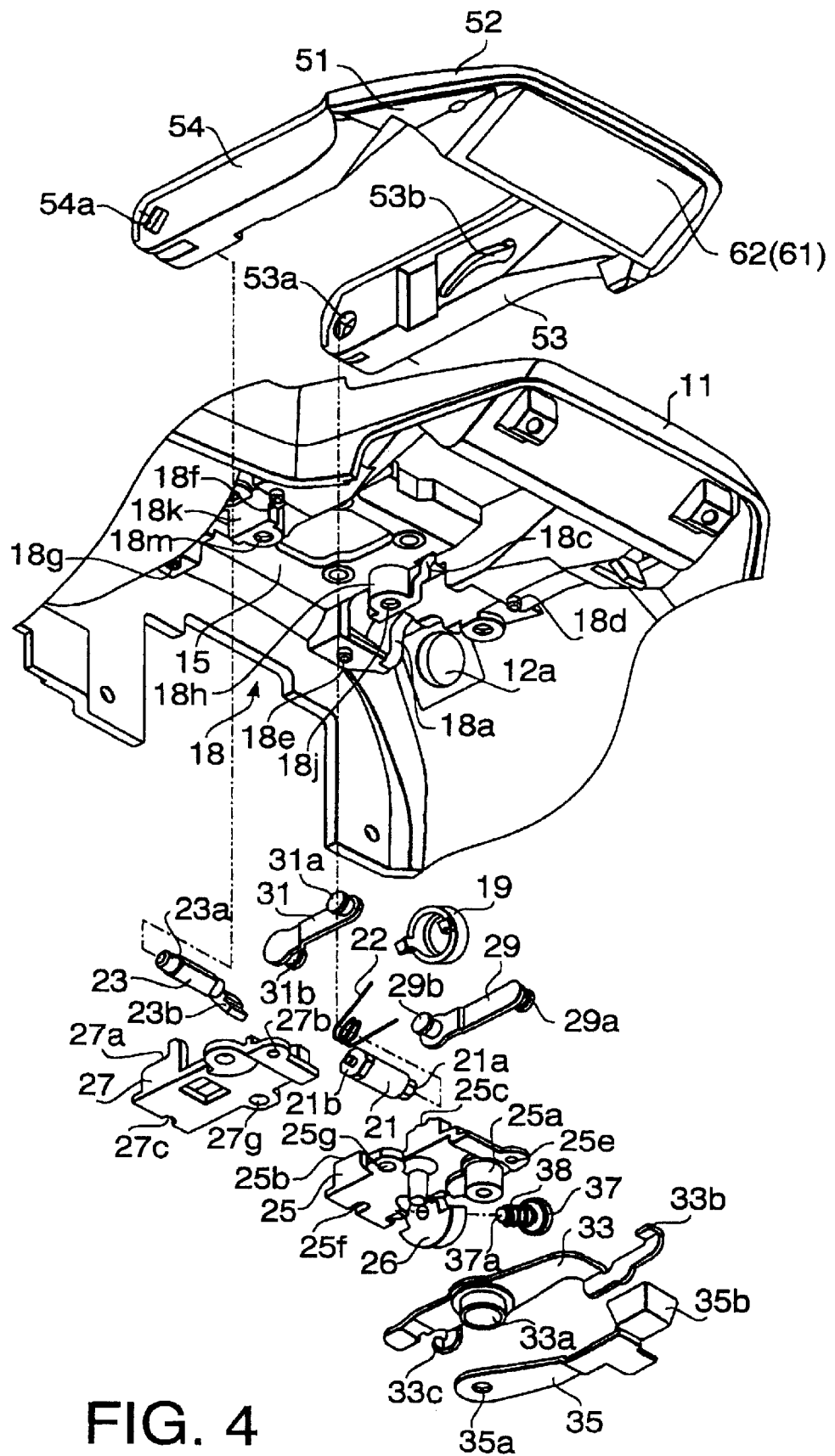
FIG. 4 is an exploded view of the strobe case and its supporting mechanism.

On the leg 53, a hook 55 is provided, which protrudes from one side thereof. The hook 55 is accommodated within the accommodating portion 17 when the strobe case 51 is located at the retracted position. An engaging groove 55a is formed at a position corresponding to the tip portion of the hook 55. When the strobe case 51 is located at the retracted position, the engaging groove 55a is engaged with an engaging protrusion (i.e., a hook 33b of a locking-lever which is shown in FIG. 4) formed inside the accommodation portion 17, thereby the strobe case 51 is held at the retracted position. Numeral 19 in FIGS. 1 and 2 denotes a pop-up button, which is operated to release the engagement of the engaging protrusion with the engaging groove 55a.

Figure 3:
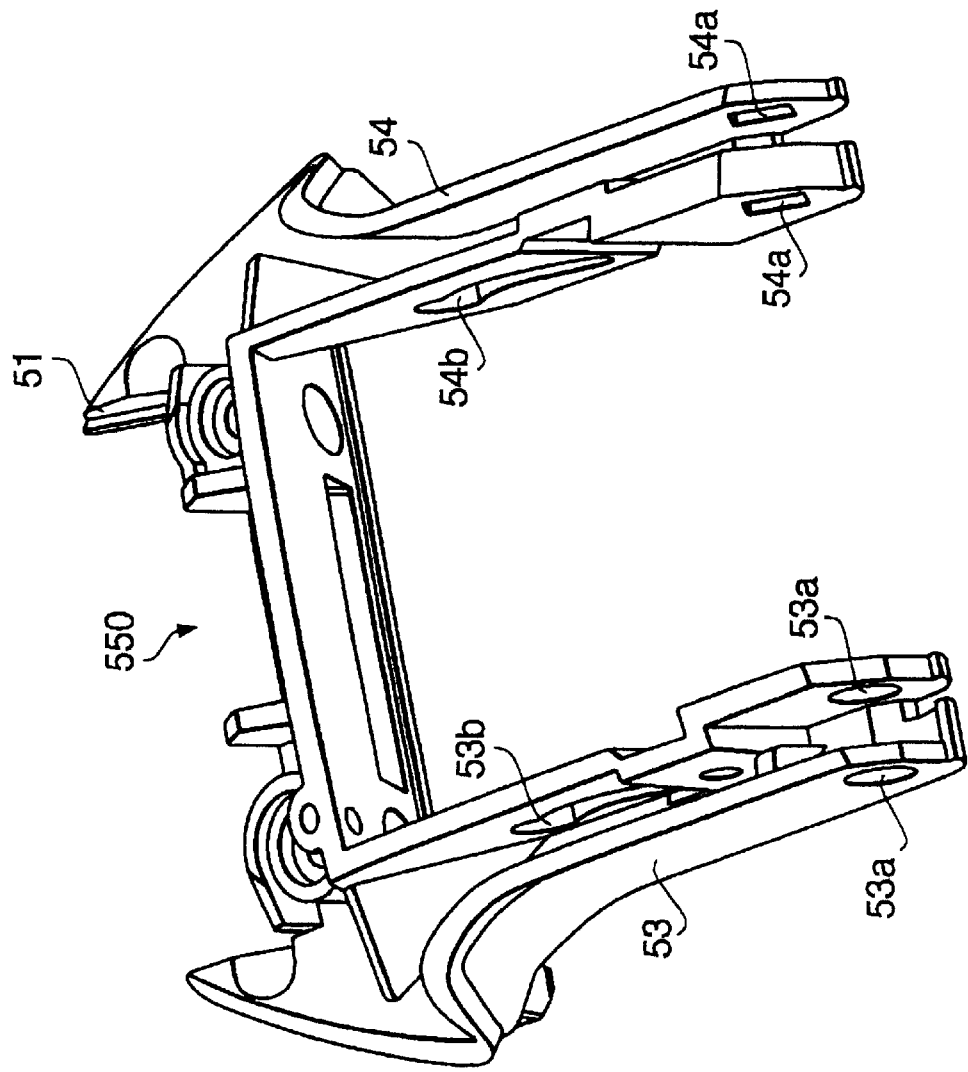
FIG. 3 shows a perspective view of a strobe case of the pop-up strobe.
Figure 5:
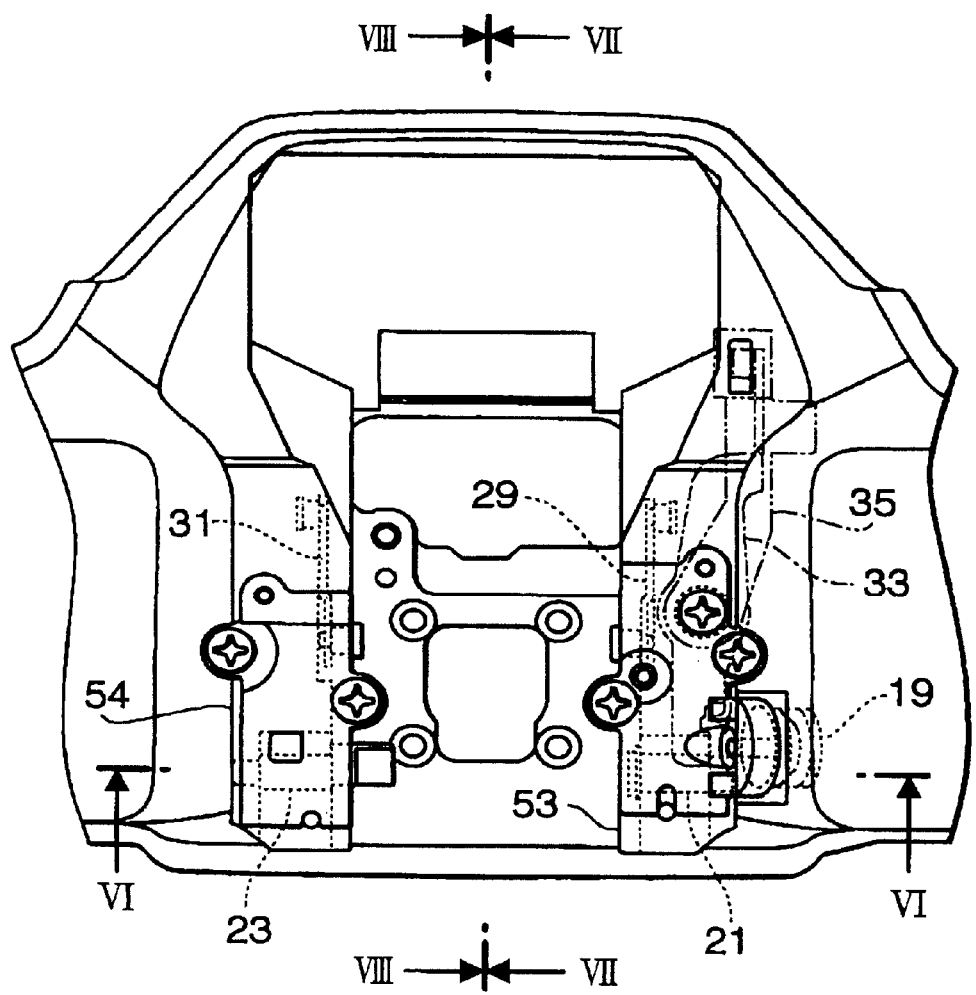
FIG. 5 shows the bottom view of the pop-up strobe as retracted from the inside of the camera.
Figure 6:
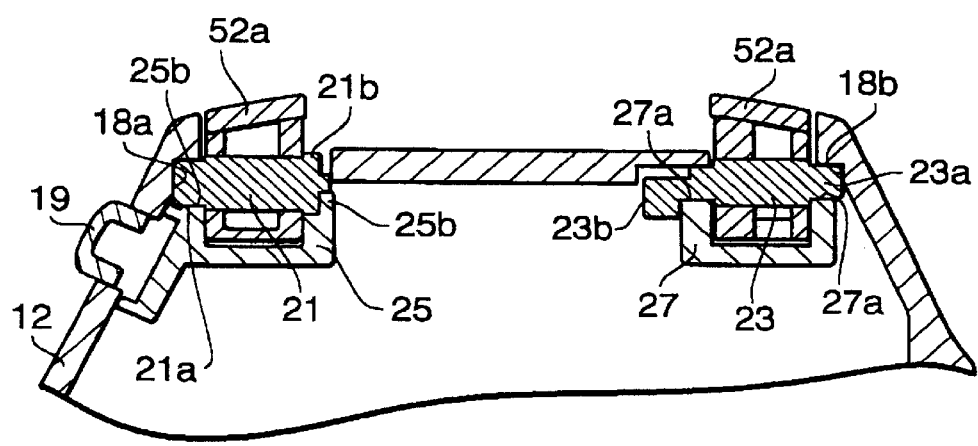
FIG. 6 is a partially sectional view of the pop-up strobe taken along line VI—VI of FIG. 5.
Figure 7:
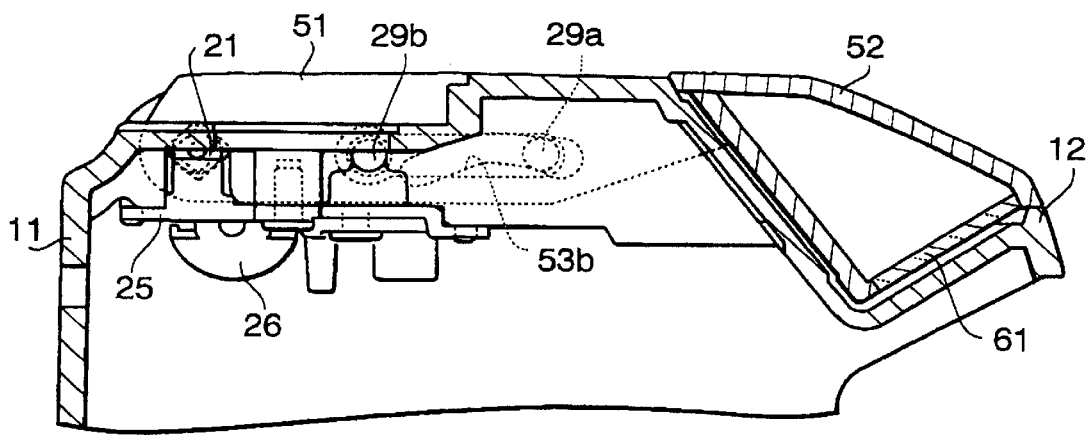
FIG. 7 is a partially sectional view of the pop-up strobe taken along line VII—VII of FIG. 5.
Figure 8:
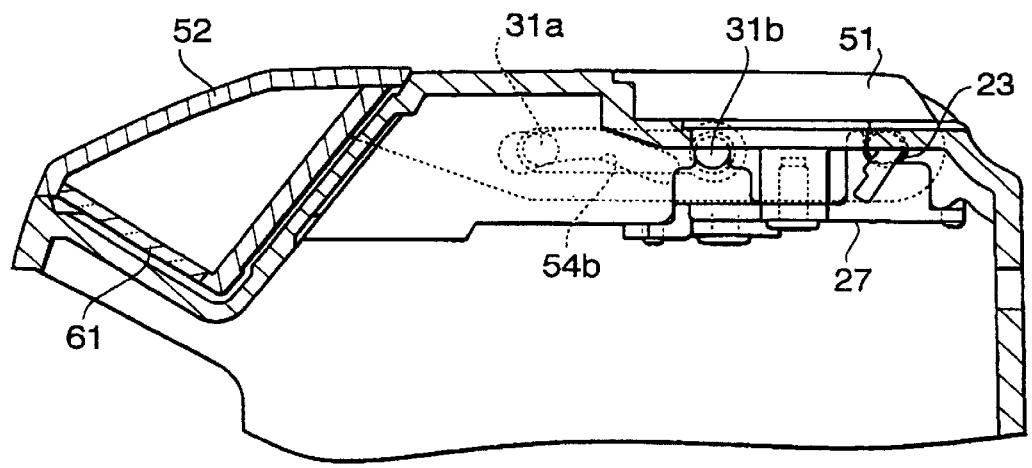
FIG. 8 is a partially sectional view of the pop-up strobe taken along line VIII—VIII of FIG. 5.

FIG. 3 is a perspective view of the strobe case 51 viewed from the leg side. FIG. 4 is an exploded view of the strobe case 51 and its supporting mechanism viewed from the bottom. FIG. 5 is a bottom view of the pop-up strobe from the inside of the camera body when the external unit 50 is retracted. FIG. 6 through 8 are partially sectional views of the pop-up strobe taken along lines VI—VI, VII—VII, and VIII—VIII of FIG. 5, respectively.

As shown in FIG. 3, the strobe case 51 has a unit attaching portion 550, to which the light emitting unit 61 is coupled. Members sandwiching the light emitting unit 61 at both sides thereof are extended to form the legs 53 and 54. As shown in FIG. 3, a cross section of each of the legs 53 and 54 is substantially U-shaped, opening thereof being directed to a direction where the strobe cover 52 is attached.

The strobe cover 52 is formed to fit on the outline of the strobe case 51, and is provided with leg covers 52a (see FIG. 2). When the strobe cover 52 is attached to the strobe case 51, the legs 52 and 53 form, together with the leg covers 52a, a boxy structure having relatively high strength against a bending force, and rigidity.

As shown in FIG. 3, on the walls at the end portion of one leg 53, co-axial round shaft holes 53a are formed. On the walls at the end portion of the other leg 54, rectangular shaft holes 54a are formed.

The tip of the legs 53 and 54 are inserted into the bulging portion 12 through openings (not shown) formed on the accommodating portion 17, respectively. Then, a cylindrical shaft 21 is inserted into the shaft hole 53a from the space between the legs 53 and 54 towards outside of the strobe case 51.

The tip end of the cylindrical shaft 21 is formed to be a polygonal portion 21a, which is, after being passed through the shaft holes 53a, fitted in a shaft receiving recess 18a (see FIG. 6), which is formed on the accommodating portion 17 corresponding to the shaft holes 53a, from a direction perpendicular to the axis of the shaft 21. The other end of the cylindrical shaft 21 is formed to be a polygonal portion 21b, which is located on the leg 54 side with respect to the shaft holes 53a. The polygonal portions 21a and 21b are formed to have rectangular cross sections. The polygonal portion 21a is not rotatable with respect to the shaft receiving recess 18a. The polygonal portion 21a is fixed with respect to the receiving recess 18a by a locking bracket 25 (which will be described latter). The other polygonal portion 21b is formed as a flange extending outwardly from the circumference of the shaft 21 and having a rectangular shape. The polygonal portion 21b is held in position by the locking bracket 25 (see FIG. 6) so that the shaft 21 is prevented from being pulled out of the shaft holes 53a. Further, a torsion spring 22 is provided around the shaft 21 (see FIG. 4) for biasing the legs 53 to pop up.

A polygonal shaft 23 having a non-circular cross-section (in the present embodiment, a square cross-section) is inserted through the rectangular shaft holes 54a from the leg 53 side toward the outside of the strobe case 51. An end portion of the shaft 23 is formed to be a cylindrical portion 23a. After being passed through the shaft holes 54a, the cylindrical portion 23a of the polygonal shaft 23 is fitted in a shaft receiving recess 18b, which is formed on an inner surface 18 of the camera body (i.e., the decorative cover 11) as shown in FIG. 6. The other end of the polygonal shaft 23 is formed to be a radially extending plate-like portion 23b. The cylindrical portion 23a is supported rotatably with respect to the shaft receiving recess 18b. The radially extending portion 23b rotates integrally with the strobe case 51, in accordance with the pop-up/retracting movement thereof, to turn ON/OFF a not shown switch that detects the pop-up/retracting status of the strobe case 51. The shaft 23 is supported by a link lever bracket 27 (which will be described later).

Thus, the shaft 21 is fixed to the shaft receiving recess 18a formed on the inner surface 18 of the camera body. Therefore, the shaft holes 53a are rotatably fitted on the shaft 21, and rotate about the shaft 21. The cylindrical portion 23a is rotatably fitted in the shaft receiving recess 18b, which is formed on the inside surface of the bulging portion 12. Since the shaft holes 54a are square, the polygonal shaft 23 rotates integrally with the shaft holes 54a. As described above, the strobe case 51 is rotatably supported by the shafts 21 and 23, while the shaft 21 does not rotate with respect to the camera body, and the polygonal shaft 23 rotates integrally with the strobe case 51.

Further, the shafts 21 and 23 are fitted In the shaft receiving recesses 18a and 18b formed on the inner surface 18 of the camera body, and then, by another member, the shafts 21 and 23 are held in position so that they will not be pulled out of the shaft holes 53a and 54a. Specifically, in the structure according to the embodiment, the shaft 21 is held in position by the lock bracket 25, which is fixed on the inner surface 18 of the camera body, and the shaft 23 is held in position by the link lever bracket 27, which is fixed on the inner surface 18 of the camera body.

The locking bracket 25 is formed to be substantially C-shaped, an opening directed toward the inner surface 18 of the camera body. On the bottom surface of the C-shaped lock bracket 25, a shaft 25a for rotatably pivoting a lock lever 33 is protruded. A cover plate 35 is fixed onto the top end surface of the shaft 25a. The locking lever 33 is rotatably supported by the shaft 25a as the shaft 25a is fitted into a hollow cylindrical portion 33a of the locking lever 33. On one tip end portion of the lock lever 33, a hook 33b which is capable of engaging with the engaging groove 55a is formed. On an opposite side of the hook 33b with respect to the hollow cylindrical portion 33a, a contacting piece 33c is formed. When the pop-up button 19 is depressed, the contacting piece 33c is pushed, thereby the lock lever 33 is rotated in a direction where the engagement of the hook 33b with the groove 55a is released. It should be noted that the locking lever 33 is biased by an elastic member (not shown), e.g., a torsion spring, in a direction where the hook 33b engages with the engaging groove 55a.

After the shaft 25a is fitted into the hollow cylindrical portion 33a of the locking lever 33, the cover plate 35 is fixed onto the side end surface of the shaft 25a. The cover plate 35 is formed to have a fixing hole 35a on an end portion thereof. By inserting a screw through the fixing hole 35a and a tapped hole formed on the shaft 25a, and fastening the screw, the cover plate 35 is fixed onto the side end surface of the shaft 25a like a cantilever. It should be noted that, with this configuration, the cover plate 35 also functions to prevent the lock lever 33 from being pulled out from the shaft 25a.

A fan-shaped piece 26 is integrally formed on the bottom of the locking bracket 25. On the fan-shaped piece 26, an opening for supporting a pin 37, which fits in the pop-up button 19, is formed. A head of the pin 37 is inserted into the pop-up button 19 which is cap-shaped, while a shaft portion 37a is inserted through the opening of the fan-shaped piece 26. The tip of the shaft portion 37a contacts the contacting portion 33c of the locking lever 33, which urges the pin 37 in a direction where the pop-up button 19 protrudes from the camera body.

The locking bracket 25 has a pair of rising pieces, which are spaced by a predetermined distance, and opposed to each other. On the tips of the rising pieces, shaft pressing portions 25b, 25b (only one is shown in the figure) for pressing the polygonal portions 21a and 21b of the shaft 21, and a link pressing portion 25c for pressing the pin 29b protruding from the end of the link lever 29 are formed (see FIG. 4). When the locking bracket 25 is fixed onto the inner surface 18 of the camera body, the polygonal portion 21a of the shaft 21 is held un-rotatably between the pressing portion 25b and the shaft receiving recess 18a of the inner surface 18, while the pin 29b is held rotatably between the pressing portion 25c and the pin receiving recess 18c.

When the locking bracket 25 is secured onto the inner surface 18 of the camera body, it is firstly positioned by engaging a positioning hole 25e and a positioning notch 25f with the positioning pins 18d and 18e, respectively. Then, a screw is screwed into a tapped hole 18j of a boss 18h protruding from the inner surface 18 of the camera body through a loose hole 25g formed on the bottom surface of the locking bracket 25.

The link lever bracket 27 is also a C-shaped structure, having an opening on the inner surface 18 side thereof. The link lever bracket 27 is formed with a pair of rising pieces spaced from each other by a predetermined distance, and opposed to each other. At the tips of rising pieces, a shaft pressing portion 27a and a link pressing portion are formed. It should be noted that the link pressing portion of the link lever bracket 27 has a substantially similar structure as the link pressing portion 25c of the locking bracket 25, and formed on the locking bracket side of the link lever bracket 27. When the link lever bracket 27 is secured onto the inner surface 18 of the camera body, the shaft pressing portion 27a rotatably holds the round portion 23a of the polygonal shaft 23 in cooperation with the shaft receiving recess 18b, and the link pressing portion presses the pin 31b protruding from the end of the link lever 31. A positioning hole 27b and a positioning notch 27c are formed on the bottom surface of the link lever bracket 27. When the link lever bracket 27 is secured onto the inner surface 18 of camera body, firstly, the positioning hole 27b and the positioning notch 27c are respectively engaged with the positioning pin 18f and 18g, which protrude from the inner surface 18 of the camera body. Then, a screw is screwed into a tapped hole 18m of a boss 18k protruding from the inner surface 18 of the camera body through a loose hole 27g formed on the bottom surface of the link lever bracket 27. With this structure, the link lever bracket 27 is fixed to the inner surface 18 of the camera body. In this fixed state, the round shaft portion 23a of the polygonal shaft 23 is rotatably supported by the shaft receiving recess 18b and the shaft pressing portion 27a. The pin 31b of the link lever 31 is rotatably supported by the pin receiving recess of the inner surface 18 of the camera body and the shaft pressing portion of the link lever bracket 27.

It should be noted that the link levers 29 and 31 are used for positioning the strobe case 51 to the popped-up (i.e., the operable) position. The pins 29a and 31a protruding from one end portions of the link levers 29 and 31 are fitted in cam grooves 53b and 54b, respectively, while pins 29b and 31b protruding from the other end portions are rotatably supported by the brackets 25, 27 and the inner surface 18 of the camera body. Each of the pins 29a, 29b, 31a, and 31b has a flange portion on the tip thereof for preventing the pins from being pulled out. The pins 29a and 31a are inserted into the grooves 53b and 54b through larger openings formed at end portions of the cam grooves 53b and 54b, respectively (see FIG. 3). As the pins 29a and 31a are slid along the cam grooves 53b and 54b, the flange portions formed at the tips of the pins 29a and 31a prevent the pins 29a and 31a from dropping out from the cam grooves 53b and 54b, respectively. When the pins 29a and 31a reach and contact the other end of the cam grooves 53b and 54b, the strobe case 51 is prevented from rotating further, and is held in that position, i.e. the popped-up position at which the pop-up strobe is operable.

Hereinafter, the process of assembling the pop-up strobe 50 to the decorative cover 11 will be described.

Firstly, each unit is assembled. For example, the light source unit 61 is attached to the strobe case 51. It should be noted that lines (not shown) for controlling the light emission of the light emitting unit 61 is extended from a space defined by the strobe case 51 and the strobe cover 52. The pin 37 provided with a coil spring 38 is inserted into the rising piece 26 of the locking bracket 25. These parts are preferably provided as pre-assembled items.

The pin 29a of the link lever 29 and the pin 31a of the link lever 31 are inserted into the cam groove 53b and 54b through the large openings formed at one ends of the cam grooves 53b and 54b, respectively, and then the pins 29a and 31a are slid along the cam grooves 53b and 54b so that the pin 29a and 31a do not pulled out from the cam grooves 53b and 54b. Then, the legs 53, 54 and link levers 29, 31 are inserted into the pop-up strobe accommodating portion 17 through the corresponding openings formed thereon.

Then, the torsion spring 22 is placed between the shaft holes 53a and 53a, the shaft 21 is inserted into the shaft holes 53a and 53a from the space between the shaft hole 53a and 54a, and the polygonal portion 21a is placed to the pin receiving recess 18a. Next, the pin 29b of the link lever 29 is placed in the shaft receiving recess 18c, and the pop-up button 19 is inserted into a flange portion 12a. Then, the locking bracket 25, which is provided with the coil spring 38 and pin 37, is secured on the inner surface 18 of the camera body using the screw. As described, when the locking bracket 25 is secured, the positioning hole 25e and the positioning notch 25f are engaged with the positioning pins 18d and 18e, respectively. Then, the torsion spring 22 is charged, and the strobe cover 52 is attached to the strobe case.

Similarly to the assembling of the shaft 21, the polygonal shaft 23 is inserted through the shaft holes 54a and 54a, and the round portion 23a is placed in the shaft receiving recess 18b. Further, the pin 31b of the link lever 31 is placed to the shaft receiving recess formed on the inner surface 18 of the camera body. Then, the link lever bracket 27 is located in position by engaging the positioning hole 27b and the positioning notch 27c with the positioning pin 18f and the positioning pin 18g, respectively. Then the link lever bracket 27 is fixed to the inner surface 18 of the camera body by means of a screw. Thus, the link lever bracket supports the round shaft portion 23a and the pin 31b, and prevents them from being pulled out. It is noted the order of fixing the strobe cover 52 and the link lever bracket 27 can be alternated. Finally, the locking lever 33 and the cover plate 35 are assembled, and the mounting of the external unit 50 is finished.

The present disclosure relates to the subject matter contained in Japanese Patent Application No. 2000-281388, filed on Sep. 18, 2000, which is expressly incorporated herein by reference in its entirety.

What is claimed is:

1. A strobe mounting structure for retractably mounting a pop-up strobe on an upper portion of a single lens reflex camera having a pentagonal prism, said pop-up strobe having a strobe case which is movable between an operable position and a retracted position, wherein said strobe case has a pair of legs, said pair of legs astride said pentagonal prism, each of said pair of legs having a U-shaped cross section taken along a plane perpendicular to a longitudinal direction thereof, said strobe case being rotatably mounted on said upper portion of said single lens reflex camera by shafts penetrating through opposing walls of each of said pair of legs.

2. The strobe mounting structure according to claim 1, wherein an opening of each of said pair of legs is directed outside a camera body when said strobe case is located in the retracted position, a strobe cover covering substantially an outlined shape of said strobe case and said pair of legs being attached to said strobe case, portions of said strobe cover covering said pair of legs and each of said pair of legs forming respective box-like structures.

3. The strobe mounting structure according to claim 1, said upper portion of said camera being provided with a decorative plate, said strobe case being mounted on said camera body via said decorative plate.

4. The strobe mounting structure according to claim 3, an end of at least one of said shafts penetrating the opposing walls of one of said pair of legs being fitted in a shaft receiving recess formed on said decorative plate, a fixing member being secured onto said decorative plate such that said shaft receiving recess and said fixing member rotatably support the end of said at least one of said shafts.

5. The strobe mounting structure according to claim 4, said fixing member being provided with a hook member used for holding said strobe case in said retracted position.

6. The strobe mounting structure according to claim 4, at least one of said pair of legs being formed with a groove extending in the longitudinal direction of said pair of legs and having a predetermined length, said strobe mounting structure further comprising at least one link arm having first and second pins at both end portions thereof, said first pin slidably inserted in said groove, said second pin being rotatably supported on said decorative plate.

7. The strobe mounting structure according to claim 6, a pin receiving recess being formed on said decorative plate, said second pin being rotatably fitted in said pin receiving recess, said fixing member preventing said second pin from being dropped out of said pin receiving recess, said second pin being rotatably supported by said pin receiving recess and said fixing member, said fixing member preventing said end of said at least one of said shafts from dropping out of said shaft receiving recess, said shaft receiving recess and said fixing member rotatably supporting said at least one of said shafts.

* * * * *